US008174805B2

(12) United States Patent
Ward

(10) Patent No.: US 8,174,805 B2
(45) Date of Patent: May 8, 2012

(54) RESIDUAL CURRENT DEVICE

(75) Inventor: Patrick Ward, Ballinasloe (IE)

(73) Assignee: Tripco Limited, Ballinasloe, County Galway (IE)

( * ) Notice: Subject to any disclaimer, the term of this patent is extended or adjusted under 35 U.S.C. 154(b) by 416 days.

(21) Appl. No.: 12/450,308

(22) PCT Filed: Mar. 3, 2008

(86) PCT No.: PCT/EP2008/001669
§ 371 (c)(1),
(2), (4) Date: Sep. 21, 2009

(87) PCT Pub. No.: WO2008/145207
PCT Pub. Date: Dec. 4, 2008

(65) Prior Publication Data
US 2010/0103569 A1 Apr. 29, 2010

(30) Foreign Application Priority Data
May 30, 2007 (IE) .................................. S2007/0390

(51) Int. Cl.
*H02H 3/00* (2006.01)

(52) U.S. Cl. .............................. 361/44; 361/45; 361/46

(58) Field of Classification Search .................... 361/44, 361/45, 46, 47, 48, 42, 49, 50
See application file for complete search history.

(56) References Cited

U.S. PATENT DOCUMENTS

| | | | | |
|---|---|---|---|---|
| 3,202,875 | A * | 8/1965 | Bateman | 361/44 |
| 6,122,155 | A * | 9/2000 | Aromin et al. | 361/42 |
| 6,259,340 | B1 * | 7/2001 | Fuhr et al. | 335/18 |
| 6,538,862 | B1 * | 3/2003 | Mason et al. | 361/42 |
| 7,609,497 | B2 * | 10/2009 | Bartonek et al. | 361/93.6 |
| 7,835,120 | B2 * | 11/2010 | Fasano | 361/42 |

* cited by examiner

*Primary Examiner* — Patrick Salce
(74) *Attorney, Agent, or Firm* — The Nath Law Group; Jerald L. Meyer

(57) ABSTRACT

A residual current device for an AC electricity supply comprises a housing (10) and a first load conductor (L) inside the housing connected in series between the supply and a load and including a set of contacts (18) by which an electrical connection between the supply and the load may be made or broken. A current transformer is disposed inside the housing and has a toroidal core (TI) the first load conductor passing through the core and forming one primary winding of the current transformer. At least one further load conductor (N) outside the housing passes through the core (T) via an opening (32) in the housing and forms a further primary winding of the current transformer. A secondary winding (W) on the core produces an output in response to a residual current, and a circuit (RCC) inside the housing is responsive to the output on the secondary winding to open the contacts if the residual current is above a predetermined level.

6 Claims, 6 Drawing Sheets

RESIDUAL CURRENT DEVICE

This is a National Phase Application filed under 35 USC 371 of International Application No. PCT/EP2008/001669, filed on Mar. 3, 2008, which claims foreign priority benefit under 35 USC 119 of Irish Application No. S2007/0390, filed on May 30, 2007, the entire content of each of which is hereby incorporated herein by reference in its entirety.

This invention relates to a residual current device (RCD).

RCDs can be divided into two categories based on the technology used:

- Voltage independent (VI) RCDs, which use the residual current as the source of energy for operation of the RCD. These are sometimes referred to as conventional or electromechanical RCDs
- Voltage dependent (VD) RCDs which use the mains supply voltage as the source of energy to operate the RCD. These are sometimes referred to as electronic RCDs.

RCD is a generic term which includes both RCCBs and RCBOs:

- RCCB: a residual current circuit breaker without overcurrent sensing.
- RCBO: a residual current circuit breaker with overcurrent sensing.

An RCCB will open automatically only in response to a residual current. An RCBO will open automatically in the event of a residual current or an overload or overcurrent condition.

FIG. 1 shows an AC electricity supply which is protected by an RCD, also known as a ground fault interrupter (GFI). FIG. 1 represents a typical single phase TN installation comprising live L and neutral N conductors supplying a load LD. The supply neutral N is connected directly to earth E, and a solid earth conductor is distributed throughout the installation. The installation is protected by an electronic type residual current circuit RCC based on a WA050 IC produced by Western Automation and powered via leads M from the mains supply.

In operation a current $I_L$ flows from the supply in the live conductor L to the load LD and returns to the supply as a current $I_N$ in the neutral conductor N. The live L and neutral N conductors pass through the toroidal core T of a current transformer CT, and serve as primary windings for the CT. The CT includes a secondary winding W on the core T whose output is connected to the RCC. Under normal conditions the currents $I_L$ and $I_N$ flowing through the core T in the conductors L, N are equal in magnitude but opposite in direction, and as a result the vector sum of these currents is zero and no current is induced into the secondary winding W.

However, if a person touches a live part, as shown in the figure, a current $I_R$ will flow through the person's body to earth and return to the supply via the earth return path. The current $I_L$ will now be greater than $I_N$ and consequently the secondary winding W will produce an output in response to this differential or residual current. This output will be sensed by the RCC, and if it meets predetermined criteria as to amplitude and/or duration a mechanical coupling between the RCC and a set of contacts S in the live and neutral conductors will cause the contacts S to open and disconnect the supply from the load LD to provide protection. This is all very well known and no further description is deemed necessary.

RCDs are often based on miniature circuit breakers (MCBs) to ensure compatibility in terms of mechanical and electrical properties and aesthetics, etc. In many cases, the basic MCB design is modified to provide for inclusion of the RCD function so as to produce an RCBO—an RCD with overcurrent protection. Such RCBOs can comprise 1 pole with solid neutral, 1 pole with switched neutral (1P+N), 2 pole, 3 pole, 3 pole with solid neutral or 3 pole with switched neutral (sometimes referred to as a 4 pole device). The term "pole" signifies a pair of contacts that can make and break a fault current, whereas the term "switched neutral" is used to indicate that the neutral pole comprises a pair of contacts that can open and close but that this pole is not fully rated to make and break a fault current because it does not have overcurrent sensing or breaking capacity.

RCDs with a solid neutral or with a switched neutral must have that pole or terminal marked N so as to avoid that pole being inadvertently used to provide protection on a phase. Such RCDs therefore have what is termed a "dedicated" neutral pole or terminal, and the installer needs to take this into consideration when fitting such RCDs in an installation.

MCBs based on IEC60898 tend to be supplied with a standard modular width, 1-pole devices being typically 18 mm wide (referred to as a single module unit), 2-pole devices being typically 36 mm wide (two module unit), 3-pole devices being typically 54 mm wide (three module unit) and 4-pole devices being typically 72 mm wide (4 module unit).

FIG. 2 consists of diagrams showing how a single module MCB, FIG. 2(*a*), can be converted to a single module RCBO with 1P and solid neutral, FIG. 2(*b*). In each figure, as well as in FIGS. 3, 4 and 6, a schematic front view of the device is shown on the left and a schematic side view on the right. In all figures the same reference signs have been used for the same or equivalent components.

The unconverted MCB comprises a narrow housing 10 having opposite substantially parallel sidewalls 10A, 10B. A conductor 12 extends inside the housing 10 between an input terminal 14 for connection to the electricity supply and an output terminal 16 for connection to the load. The conductor 12 includes a pair of contacts (single pole) 18 by which the electrical connection between the terminals 14 and 16 can be made or broken. These contacts can be opened manually by a toggle switch 20, or automatically in response to an overcurrent flow through the conductor 12. Means to sense the overcurrent and cause automatic opening of the contacts 18 (tripping) are not shown but are well known to those familiar in the art of circuit breaker operation.

In the RCBO, FIG. 2(*b*), the MCB housing 10 is extended (while not increasing its width between the sidewalls 10A and 10B) so as to provide room to fit a current transformer CT and other RCD circuitry as shown (the RCC power supply leads are omitted from the side view and all but the core T is omitted from the front view). The conductor 12 is the live conductor L and a neutral conductor N is added, passing through the toroidal core T. As before, the RCC is mechanically coupled to the contacts 18 so as to cause automatic opening of the contacts in the event of a residual fault current. RCDs are generally provided with a test button 22 so as to enable the user to verify the operation of the RCD.

The main advantage of the arrangement of FIG. 2(*b*) is that an RCBO can be produced having the same width as a single module MCB. This type of RCBO can be conveniently used to replace a single pole MCB as part of an upgrade to add RCD protection to a circuit.

A major disadvantage of the arrangement of FIG. 2(*b*) is that in conventional RCD designs the 18 mm width of the single module places severe constraints on the RCD designer and the user. Due to space constraints within the 18 mm module width, it is generally not possible to connect two supply and two load terminals for the L and N conductors because such terminals would be extremely small and would severely restrict the size and current ratings of conductors that could be used. Common practice in this arrangement is therefore to feed the live conductor L from the supply terminal 14 through the core T en route to the load terminal 16. The neutral conductor N is provided with a terminal 24 for the load side connection only, from where a conductor is routed internally via the CT, but which then exits the housing 10 as a wire, often coiled up like a pigtail.

Note that the L and N conductors must be routed through the core T in the same direction so that their load currents cancel. Designers and manufacturers are faced with serious problems of optimising components and parts, assembly issues, etc. Users or installers are faced with problems of severely limited load current rating, small terminals, and possible confusion as to supply and load connections and polarity, (live or neutral), etc.

FIG. 3 shows an arrangement for a 2 module (1P+N) RCBO. In this arrangement, two single pole MCBs are placed side by side to form a two-module device. The RCD portion is usually placed in the in N half of the RCBO, and to accommodate the RCD, various circuit breaker elements such as the overcurrent sensing and tripping means and the arc stack, etc., are removed from that half. This arrangement is sometimes referred to as a pod arrangement because the RCD portion is considered to be like a pod being carried on the back of the MCB. It will be noted that in this case the neutral conductor N is switched as well as the live conductor L, and has both supply and load terminals 28, 30 respectively in its housing 10. Production of 3 and 4 pole RCBOs follows a similar pattern to that of the arrangement of FIG. 3, with the modular width getting wider.

The arrangement of FIG. 3 is slightly better than that of FIG. 2(*b*) in that two modules are used, which facilitates four fully sized supply and load terminals. However, because the toroidal core T still has to be fitted within an 18 mm module, conductor sizes will still be constrained by the relatively small space available inside the module which limits the maximum diameter of the core T that can be used, and assembly problems will still be present.

Critically, the arrangements of FIGS. 2(*b*) and 3 do not lend themselves readily to the production of 3 and 4 pole RCDs because of the need to route three or four conductors through a toroidal core within a single module. Each load conductor has to be brought from its own pole through the core T and back to its supply or load terminal within its own module. In addition, 3 and 4 pole RCBOs may be used on a single phase (L+N) circuit or on a two phase (P+P) circuit. The RCD circuitry must still function in such cases regardless of which pair of supply terminals are used on the RCD to supply a load. In the case of a VD RCD it will be necessary to have a supply connection to the electronic circuit from all poles of the RCD. This requires routing of wires or terminals from each pole of the RCD to the location of the electronic circuit.

Production of 1, 2, 3 and 4 module RCDs is usually achieved by having a dedicated 1, 2, 3 and 4 module RCD housing for each of these variants with the result that each product has to be produced as a stand alone product. With conventional assembly processes, it is not possible to convert a 1P RCD into a 2, 3 or 4 pole RCD. Also, given that a 4 module RCD can be used to protect a three phase circuit without neutral, manufacturers are less inclined to produce 3 module RCDs. Users requiring protection of a three phase circuit therefore often tend to be burdened with the cost and bulky size of a 4 module RCD rather than having an optimised product for such applications.

There are RCD products on the market based on the MCB modular principle. In such case a toroidal current transformer core is located in one of the modules and all of the load conductors, which are external to the module containing the core, pass through the core by passing through an opening in the module housing. Thus the module containing the core acts simply as a residual current detector, but does not in itself perform any circuit breaking function in response to a detected residual current. This has to be performed in one or more additional devices, according to the number of load conductors.

It is an object of the invention to provide an improved RCD which mitigates the above problems associated with conventional devices.

This object is met by the invention claimed in claim 1.

Embodiments of the invention will now be described, by way of example, with reference to the accompanying drawings, in which:

FIGS. 1 to 3, previously described, are schematic diagrams of various RCDs according to the prior art.

Figure 1:
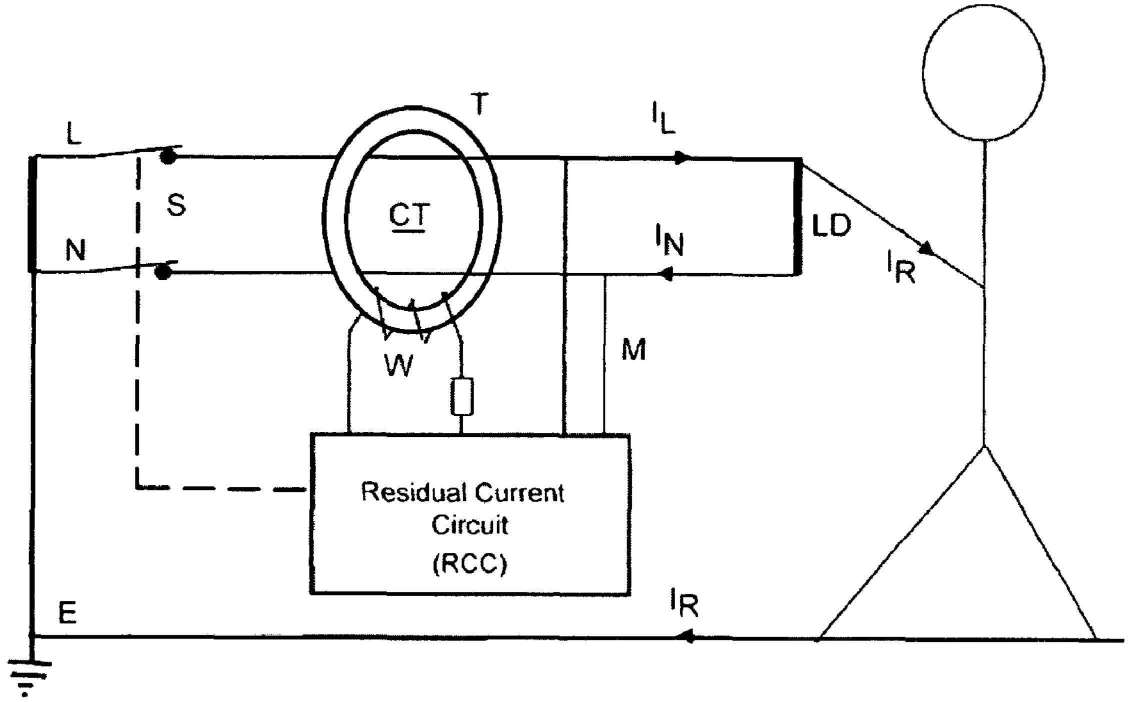
FIG 1 (PRIOR ART)
Figure 2:
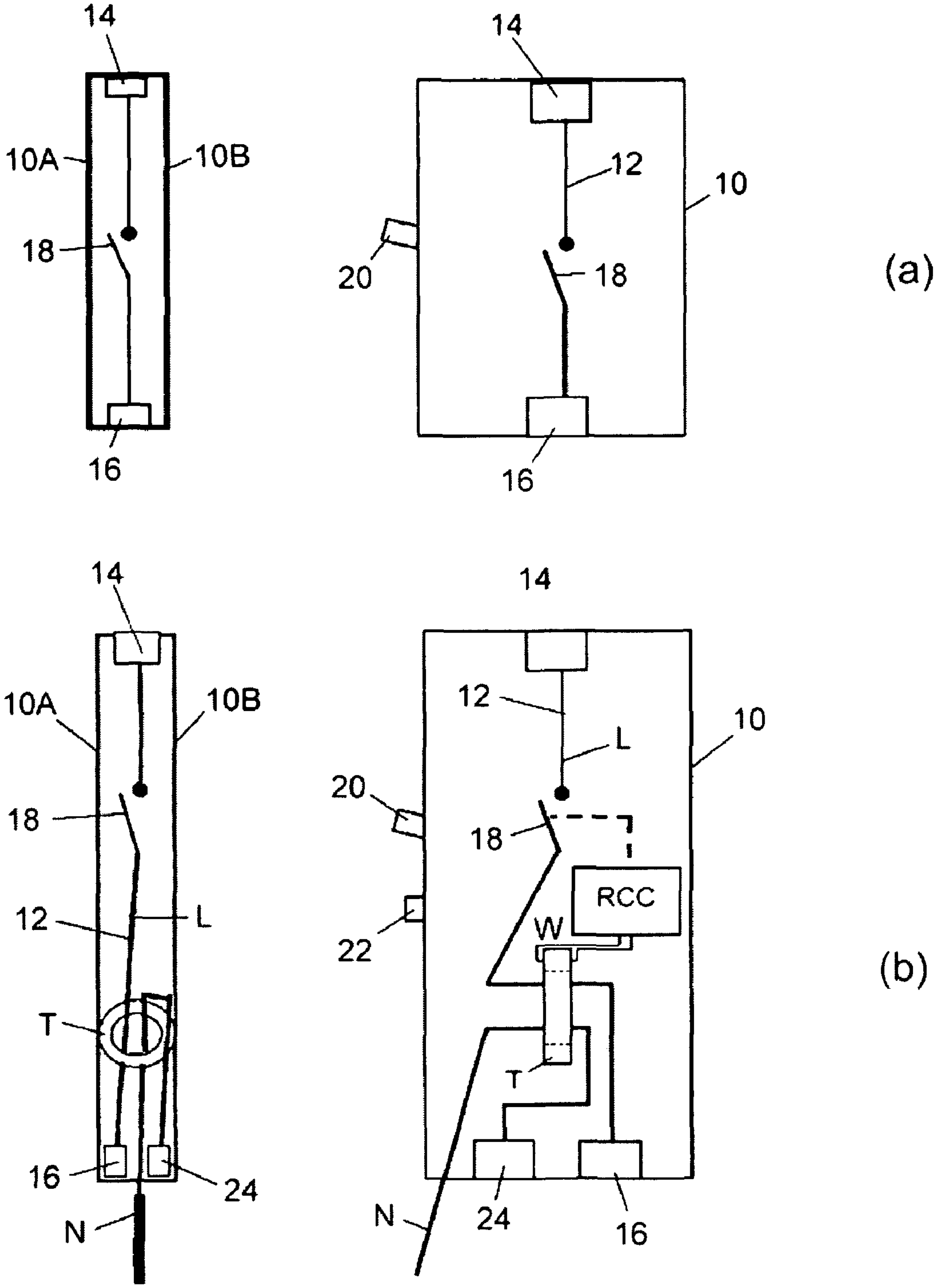
FIG 2 (PRIOR ART)
Figure 3:
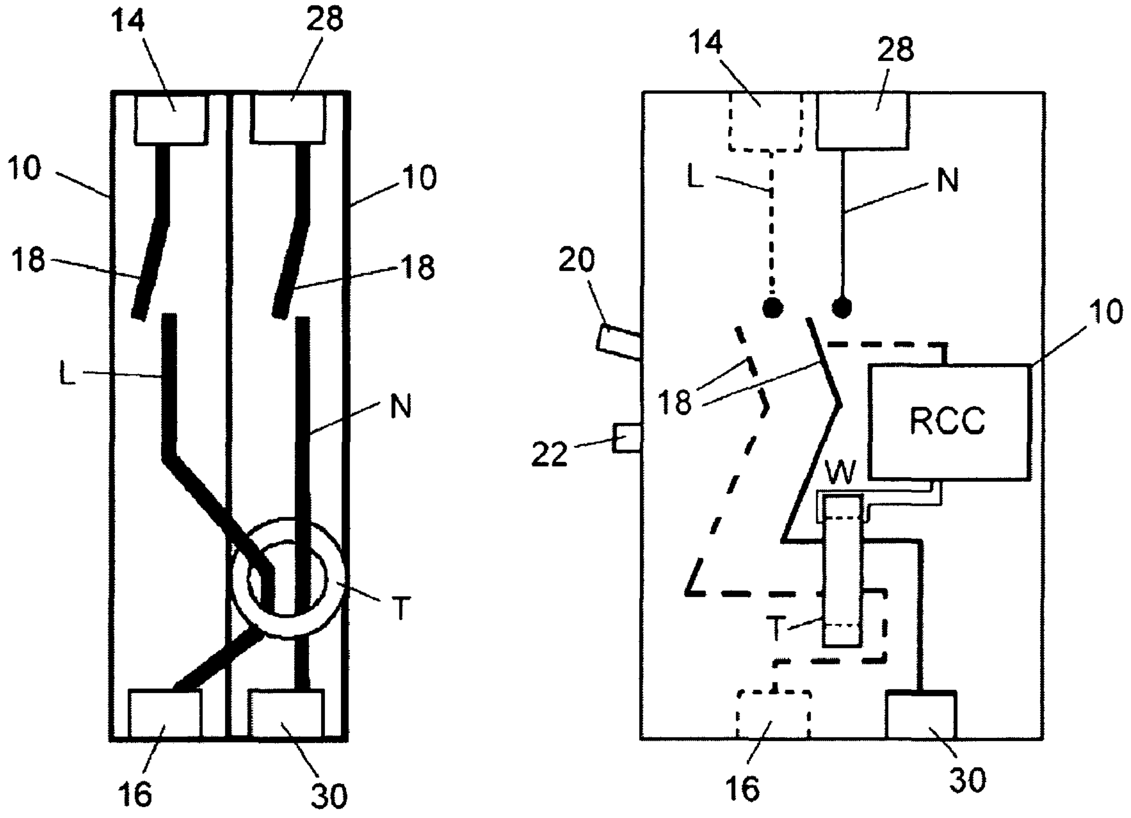
FIG 3 (PRIOR ART)
Figure 4:
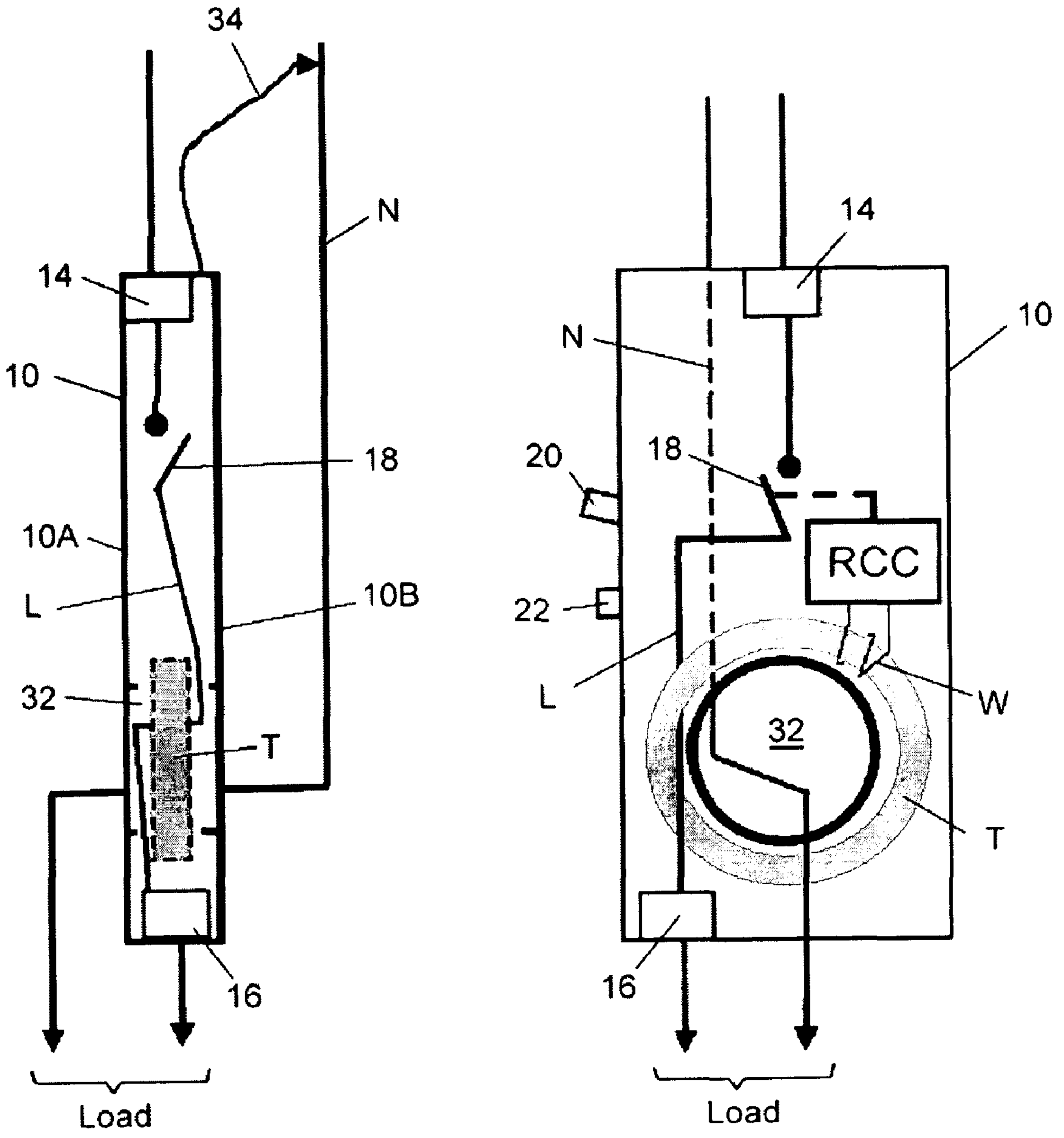
FIG. 4 shows schematic front and side views of a first embodiment of the invention.

In the embodiment of FIG. 4, a narrow housing 10 of an extended single module MCB has opposite parallel sidewalls 10A and 10B and supply and load terminals 14, 16 respectively. The housing contains a toroidal core T of a current transformer and other RCD components as shown. To overcome the constraints of size and wiring arrangements that normally apply to the core when fitted in an 18 mm wide single module housing, the core T is arranged in a plane parallel to the sidewalls 10A, 10B and disposed in the extended section of the housing so as to facilitate a core T of substantially greater size than the core used in the conventional arrangement. Whilst the module width is still nominally 18 mm, the extended housing section can be over 30×30 mm and thus provide for the use of a core with a substantially larger internal and external diameter than cores normally used in single module RCBOs.

In the extended housing section an opening 32 is formed in the housing which extends between the opposite sidewalls 10A, 10B and passes through the inside diameter of the core T. The live load conductor L, which extends inside the housing 10 from the supply terminal 14 to the load terminal 16 and contains the contacts 18, passes through the toroidal core T between the core internal diameter and the edge of the opening 32 and is therefore not exposed externally. The section of the internal load conductor L passing through the core can be formed as a pressed part so as to minimise the gap required to pass it between the core and the opening. The supply and load terminals 14, 16 for the live internal conductor L are fully sized and rated as for a normal MCB.

It can be seen that there is no provision for a neutral load conductor or neutral terminals to be provided as an integral part of the RCD. For installation purposes, the live supply and load connections are made to the RCD as for a conventional MCB, but a neutral conductor N is simply taken from the supply side neutral, passed through the opening 32 and then connected to the load to complete the RCD-protected circuit. The front view of the RCD shows the direction for routing of the neutral conductor N so that the L and N load currents cancel within the current transformer. Operation of the RCD is as for a conventional RCD in that when a differential current above a predetermined level flows between L and N, the RCD will trip.

The arrangement of FIG. 4 can also be used for a VD RCD. When used as a VD RCD, it is necessary to connect a lead 34 to the supply neutral so as to provide power to the internal electronic circuitry of the RCD.

The above arrangement can be extended to provide for 2, 3 or 4-pole RCDs. A single MCB can be added to produce a 2-pole RCD for single phase or 2 phase applications. Two MCBs can be added to produce a 3-pole RCD for three phase applications, and 3 MCBs can be added to produce a 4-pole RCD. Where a neutral is required, an MCB can be used to provide the neutral pole and connection, or a solid wire can be fed from the supply N via the RCD opening 32 to provide a neutral connection to the load and thereby obviate the use of an MCB for that purpose.

Figure 5:
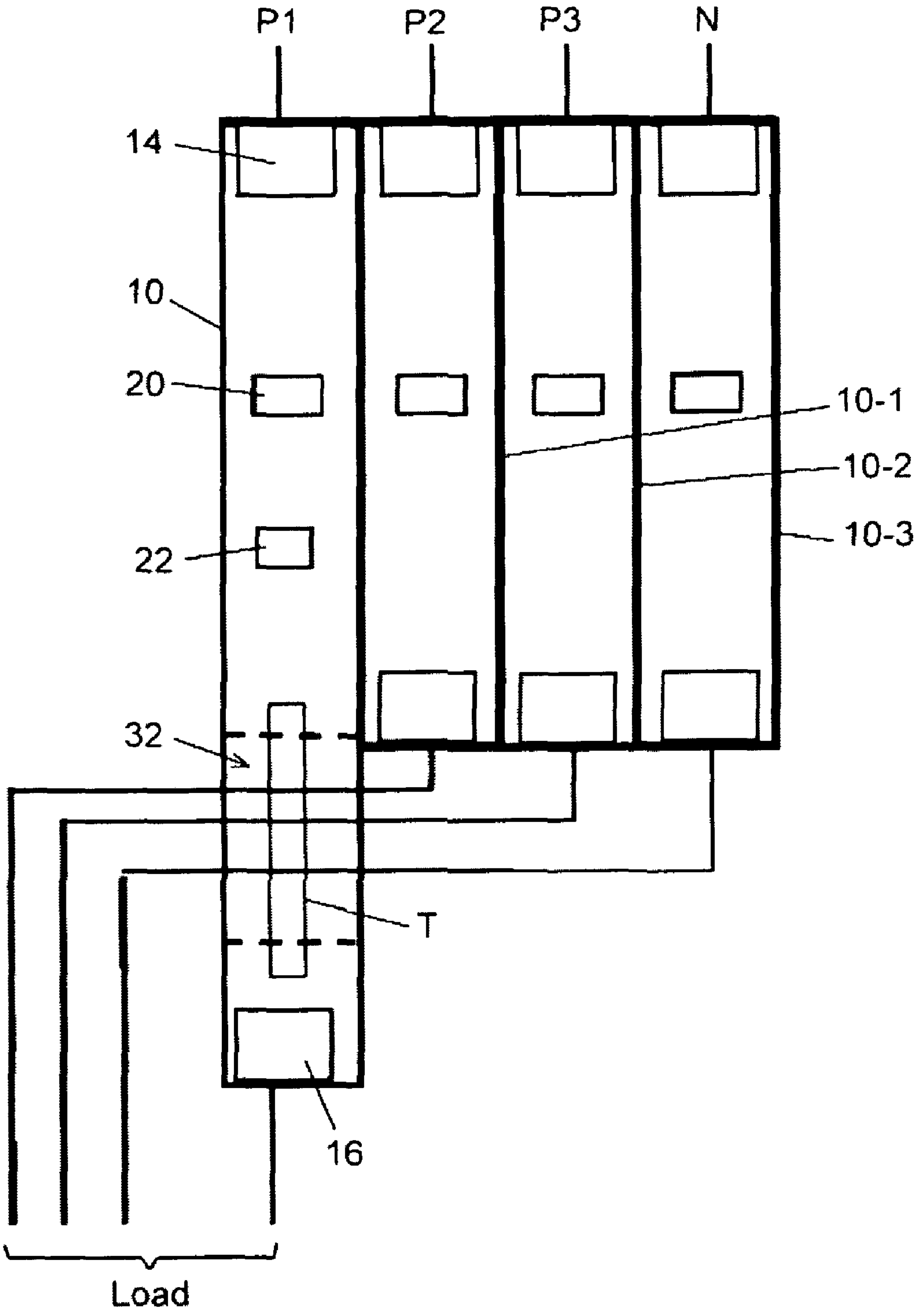
FIG. 5 illustrates how the embodiment of FIG. 4 may be extended for multi-pole devices.

For example, FIG. 5 shows the case of a 4-pole RCD for a supply having three phase conductors P1, P2, P3 and a neutral conductor N. The conductor P1 extends from the supply terminal 14 to the load terminal 16 inside the extended MCB housing 10 (LHS of FIG. 5), and in doing so passes through the toroidal core T inside the housing 10 in the manner of the live conductor L in FIG. 4. The other phase conductors P2, P3 and the neutral conductor N extend through their own single module MCB housings 10-1, 10-2, 10-3, which are attached directly or indirectly to the extended housing, and then pass through the opening 32 of the extended housing 10 and hence through the core T. Each of the housings 10, 10-1, 10-2, 10-3 has a pole (pair of contacts), such as the pole 18 in FIG. 4, in the load conductor P1, P2, P3 or N passing through that housing. All such poles are mechanically coupled to the pole in the extended housing 10 so that all poles are opened in the event of any one pole being opened due to an overcurrent or a residual current condition (it will be understood that in this and other embodiments the extended housing 10 still retains overcurrent detection and tripping means of the standard, unmodified MCB). In accordance with the requirement of RCD product standards for "trip free operation", such mechanical coupling will ensure tripping of all poles even if one or more toggle switches are held in the closed position.

The arrangement of FIG. 5 is shown for a VI RCD. To facilitate the use of an electronic RCD, a power connection like the lead 34 of FIG. 4 can be made from the extended housing 10 to the supply N and/or each supply phase for each MCB fitted so as to ensure operation of the VD RCD when any two supply connections are available to the RCD.

Figure 6:
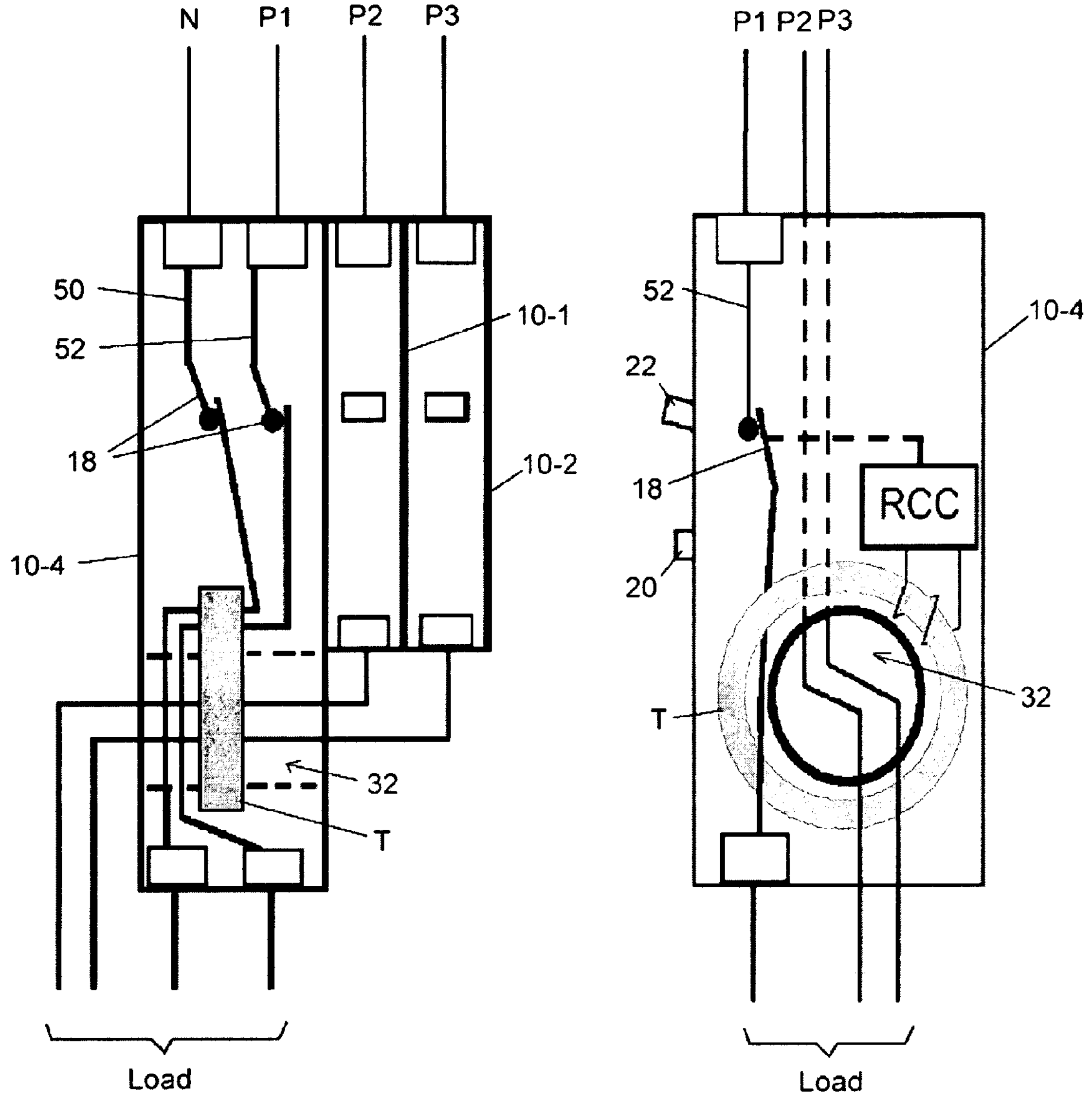
FIG. 6 shows schematic front and side views of a further embodiment of the invention.

FIG. 6 shows an embodiment wherein an extended 2-pole MCB housing 10-4 and two standard single pole MCB housings 10-1 and 10-2 are used as the basis of a 4-pole RCD for a supply comprising three phases P1, P2 and P3 and neutral N. In this arrangement, the two internal conductors 50, 52 of the 2-pole housing 10-4, respectively connected to the P1 and N supply conductors, are passed through the core T internally of the housing 10-4 (only the P1 load conductor is shown in the housing 10-4 in the side view but the N load conductor which is not shown will be located behind and in line with the P1 conductor within the two-module housing). The other phase conductors P2, P3 extend through their own single module MCB housings 10-1, 10-2 and then pass through the opening 32 of the extended housing 10-4 and hence through the core T. Each of the housings 10-1 and 10-2 has a pole 18 (not shown) in the load conductor P2 or P3 passing through that housing. All such poles are mechanically coupled to the pole in the extended housing 10-4 so that all poles are opened in the event of any one pole being opened due to an overcurrent or a residual current condition.

The embodiment of FIG. 6 may be extended to 3-pole RCDs by omitting the module housing 10-2, in which case any two load conductors pass inside the RCD module 10.4 and the third load conductor passes via the module 10.1 through the opening 32 as before.

Various changes can be made to the foregoing embodiments. For example, the embodiments may be converted to RCCBs by omitting the overcurrent sensing elements from the MCB modules as appropriate. The extended housing can be arranged to be fitted to the left or right of the MCBs. The opening 32 can be located at the top or bottom end of the extended housing as convenient.

In the foregoing embodiments the invention has been described in relation to an AC supply using a current transformer with a toroidal core as a differential current sensor. However, other types of sensor may be used, based upon the use of a toroidal or other apertured core (e.g. Hall effect current sensor), or otherwise. The invention may also be applied to DC applications provided that the residual current sensor is of a type which can detect DC residual currents. The use of DC-responsive RCDs is common in DC installations supplying underground trains, and in photovoltaic generators, etc.

The invention is not limited to the embodiments described herein which may be modified or varied without departing from the scope of the invention.

The invention claimed is:

1. A residual current device for an electricity supply, the device comprising:

a housing having an opening extending between opposite substantially parallel sidewalls of the housing, a current transformer inside the housing, the transformer comprising an apertured core disposed between and generally parallel to the sidewalls, the opening in the housing passing through the core, at least one load conductor inside the housing connected in series between the supply and a load and including a set of contacts by which an electrical connection between the supply and the load may be made or broken, the at least one load conductor passing through the core inside the housing between the inside diameter of the core and the opening so as not to be exposed externally of the housing, at least one further load conductor outside the housing and passing through the apertured core via the opening in the housing, the current transformer being responsive to the currents in the load conductors passing through the core to produce an output in response to a non-zero vector sum of said currents, and circuit means inside the housing and responsive to the output of the sensor to open the contacts if the non-zero vector sum of currents meets predetermined criteria as to amplitude and/or duration.

2. A residual current device as claimed in claim 1, wherein the supply comprises live and neutral, and wherein the first load conductor is connected to live and the at least one further load conductor is connected to neutral.

3. A residual current device as claimed in claim 1, wherein the supply comprises a plurality of phases and neutral, wherein the first load conductor is connected to one of the phases, and wherein there are a plurality of further load conductors, one of the further load conductors being connected to neutral and the other load conductor(s) to respective other phase(s).

4. A residual current device as claimed in claim 3, wherein each further load conductor extends through a respective further housing attached directly or indirectly to the first housing, and wherein each further load conductor which is connected to a phase includes a respective further set of contacts inside the respective further housing, the further set of contacts being mechanically coupled to the first set of contacts for opening therewith.

5. A residual current device as claimed in claim 3, wherein the supply comprises a plurality of phases and neutral, wherein the first load conductor is connected to a first phase, wherein a second load conductor inside the housing is connected in series between neutral and the load and includes a second set of contacts, the second load conductor passing through the core, and wherein the further load conductor is connected to a second phase, the second set of contacts being mechanically coupled to the first set of contacts for opening therewith.

6. A residual current device for an electricity supply, the device comprising:

a housing having at least one input terminal for connection to the supply, at least one output terminal for connection to a load, and an opening extending between opposite substantially parallel sidewalls of the housing, a current transformer inside the housing, the transformer comprising an apertured core disposed between and generally parallel to the sidewalls, the opening in the housing passing through the core, a first load conductor inside the housing extending between the input and output terminals and including a set of contacts by which an electrical connection between the input and output terminals may be made or broken, the first load conductor passing through the core inside the housing between the inside diameter of the core and the opening so as not to be exposed externally of the housing, the opening in the housing allowing at least one further load conductor outside the housing to pass through the core via the opening, the current transformer being responsive to the currents in the load conductors passing through the core to produce an output in response to a non-zero vector sum of said currents, and circuit means inside the housing and responsive to the output of the sensor to open the contacts if the non-zero vector sum of currents meets predetermined criteria as to amplitude and/or duration.

* * * * *